Feb. 22, 1955  R. K. FRAZIER ET AL  2,702,609
ACCURATE POSITIONING DEVICE
Filed July 6, 1949

ROBERT P. BENNETT
RADFORD K. FRAZIER
INVENTORS

BY Killman and Kerst
ATTORNEYS

United States Patent Office 2,702,609
Patented Feb. 22, 1955

2,702,609

ACCURATE POSITIONING DEVICE

Radford K. Frazier, Towson, and Robert P. Bennett, Frederick, Md., assignors to Bendix Aviation Corporation, Towson, Md., a corporation of Delaware Application July 6, 1949, Serial No. 103,308

6 Claims. (Cl. 188—69)

This invention relates to devices for accurately positioning a moving object. Such devices are particularly adapted to the accurate positioning of a motor driven object which must be stopped at a precise location. Such stopping cannot be obtained by preselecting the point where the motor is deenergized, due to the variable coasting distance of the motor.

Although devices for this purpose have been constructed, they have been unduly complex, costly, and subject to an undesirable loss of accuracy with wear as well as requiring an excessive amount of force for the release of the object.

It is an object of the invention to provide a positioning device capable of accurately stopping a moving object which is simple and inexpensive to construct.

It is another object to provide such a device which requires little force for the release of the positioned object.

It is a further object of the invention to provide such a device which is capable of operation for long periods of time without appreciable loss of positioning accuracy.

The objects and advantages of the invention are realized by a device including a motor driven wheel provided with spaced peripheral recesses. A reciprocable plunger is positioned for movement normal to the face of the wheel and is terminated in a pin receivable with a snug fit in the wheel apertures. An energizing circuit for the motor is provided, which includes a switch. A resilient actuator for the switch is provided, which in the open position of the switch presses the plunger toward the wheel so that the pin penetrates an aperture when coincidence occurs. The plunger is supported at its end remote from the wheel by a hinged, solenoid controlled, lever and at its end which is adjacent to the wheel by a leaf spring extending parallel to the wheel face and having one end fixed. The other end is secured to the pin end of the plunger. The leaf spring is secured to the plunger by having formed in it a hole through which the pin passes and snugly fits and by having its end bent back into a groove formed in the plunger.

Figure 5:
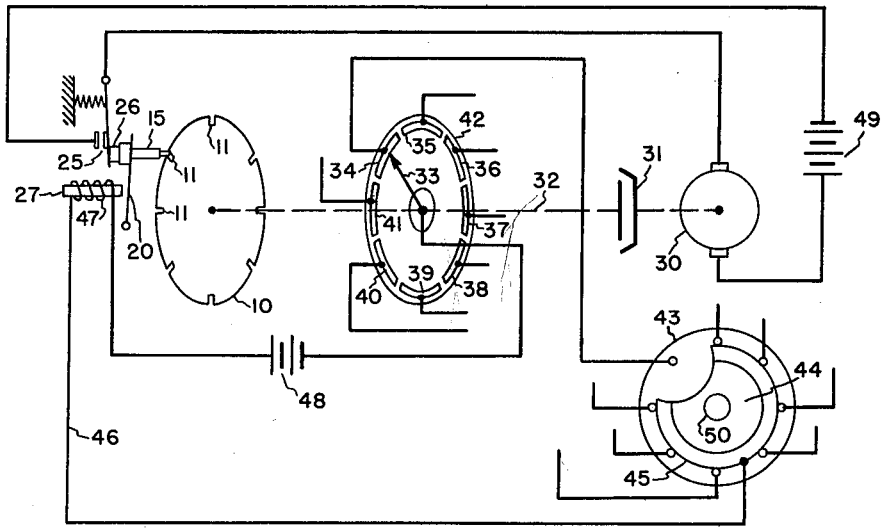

The element to be positioned is a wheel 10 which is provided around its periphery with uniformly spaced radially directed slots or recesses 11. The wheel is motor driven through a gear wheel 12 and a slipping clutch. The slipping clutch is not shown in detail, a portion 13 having the appearance of a casing being shown in Fig. 1. The wheel 10 is secured to a shaft 14 by means of which any object to be ultimately positioned can be driven.

Coacting with the wheel 10 is a reciprocable plunger 15, having at one end an enlarged head 16 and terminating in its other end in a pin 17 of uniform diameter and so dimensioned as to be receivable in any of the slots 11. The plunger 15 is provided adjacent the end terminating in the pin 17 with an annular groove 18 for a purpose to be later described.

Figure 1:
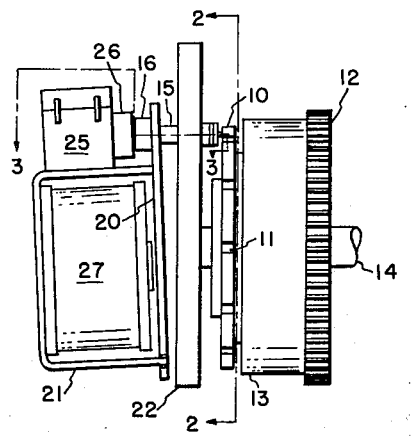
Fig. 1 is a side elevation of one embodiment of the invention.
Figure 2:
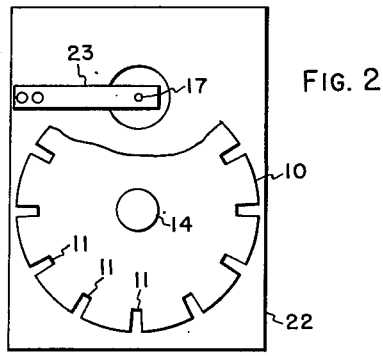
Fig. 2 is an elevation of a portion of the device of Fig. 1 looking toward the wheel from the line 2—2 of Fig. 1.
Figure 3:
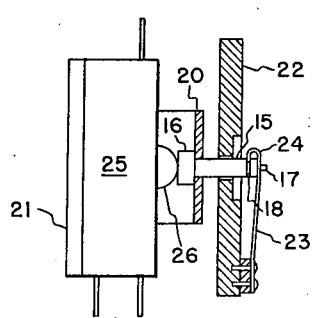
Fig. 3 is a plan view of a portion of the device of Fig. 1 partly in cross section, taken along the line 3—3 of Fig. 1.
Figure 4:
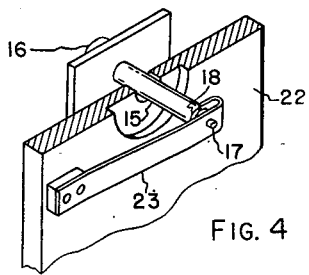
Fig. 4 is a perspective view of a fragment of the device of Fig. 1 showing the details of the leaf spring and its connections; and, Fig. 5 is a schematic diagram of a control circuit employing a positioning device of the type shown in Fig. 1.

The plunger 15 is supported at the end having the enlarged head 16 by means of a hinged plate 20. The plate 20 is shown as extending vertically and having a hinged connection at its lower end with a fixed supporting member 21 which has as shown in Fig. 1, a cross sectional configuration in the shape of a C. The plunger 15 is thrust through an aperture formed near the upper end of the plate 20 in which it is snugly, but not tightly, received. The intermediate portion of the plunger 15 passes through an enlarged hole formed in a vertical plate 22 which is a fixed part of the supporting structure. The end of the plunger 15 which terminates in the pin 17 is supported by means of a leaf spring 23, one end of which is secured to the plate 22. The major surfaces of the leaf spring extend in substantial parallelism with the face of the wheel 10. Near the remaining end of the leaf spring 23 is formed a small hole through which the pin 17 extends and is snugly received. The extreme end of the leaf spring 23, which extends beyond the pin 17, is bent back at 24 and is received in the annular groove 18.

The hinged plate 20 and the leaf spring 23 form a supporting system for the plunger 15 which allows it to be reciprocated in substantial parallelism with itself so that the pin 17 may be inserted into any one of the recesses 11 with which it may be brought into coincidence and may easily be withdrawn therefrom. The leaf spring 23 also provides, for the pin 17, a flexible supporting and bearing means which, while allowing the pin reciprocal motion in directions normal to the face of the wheel 10, effectively and accurately restrains it from sideways motion in response to the rotation of the wheel 10. The fit between the pin 17 and the hole in the leaf spring through which it extends may be maintained snug over long periods of time, thus maintaining the positioning accuracy of this portion of the mechanism substantially undiminished.

Mounted on the upper arm of the C-shaped member 21, is a switch 25 which may be of the precision limit type. The switch 25 is provided with a resilient actuator 26 which normally bears against the head 16 of the plunger 15 with sufficient force to maintain the end of the pin 17 in contact with wheel 10 and to cause it to be inserted into one of the recesses 11 when coincidence occurs. In this position of the actuator 26, the switch 25 is open. Mounted on the upright portion of the member 21 is a solenoid 27 the core of which is in such proximity to the plate 20 as to act upon it when the solenoid is energized. The solenoid is of sufficient power to overcome the resilient switch actuator 26 and to move the plate 20 to the left sufficiently to withdraw the pin from contact with the wheel 10 and to close the switch 25.

There is illustrated in Fig. 5 a control system of a type to which the accurate positioning device of the invention readily lends itself. This system is of a type employed for the automatic tuning of radio equipment when shifting from one preselected frequency to another in response to the manual manipulation of a switch. In the system shown in Fig. 5 the wheel 10 is shown as driven by the motor 30 through a slipping clutch 31. The wheel 10 is connected to the clutch 31 by means of a shaft 32 to which is fixed a contact 33 coacting with peripherally located contacts 34 to 41, inclusive, carried by a nonconducting plate 42. Each of the contacts 34 to 41 is conductively connected to a similar contact similarly arranged about the periphery of a remotely located switch plate 43. Coacting with the plate 43 is a second plate 44 provided with a peripherial conductive element 45. The element 45 forms a major portion of a complete circle, being broken at one point, whereby it is in contact with all the contacts of the plate 43 except one. The element 45 is connected by a conductor 46 to the winding 47 of solenoid 27, thence through a battery 48, to the contact 33. The motor 30 is energized through a circuit including a battery 49 and the switch 25.

The control system of Fig. 5 operates in the following manner: In the condition illustrated, the contact 33 is touching contact 34. The contact of the plate 43 to which contact 34 is connected, is however, not touching the contact member 45 and the solenoid circuit is thus open. In this condition, the switch 25 is open, the resilient actuator 26 has forced the plunger 15 to the right and the pin 17 is inserted in one of the slots 11 of the wheel 10. The motor exciting circuit being open, the motor is at rest. If now it is desired to drive the wheel 10 to a new position which will be accurately defined when the pin 17 is inserted into another one of the slots 11, the plate 44 is manually turned by means of its knob 50 until the desired peripheral contact of the plate 43 is out of contact with conductive element 45. This will cause a circuit to be completed through contacts 33 and 34 to the corresponding contact of the plate 43, conductive element 45, conductor 46, solenoid winding 47 and the battery 48. The solenoid 27 will thus be energized, the plate 20 drawn to the left releasing the wheel 10, and the switch 25 will be closed, energizing the motor 30. The motor will turn the wheel 10 and the contact 33 until the latter reaches the one of the contacts 34 to 41 which is not connected to the contact element 45. The solenoid circuit will thereupon be broken, releasing the plate 20. The actuator 26 presses the pin 17 against the plate 10, but it does not travel far enough to operate switch 25 to open the motor circuit until the motor has driven the plate 10 to a position which allows the pin 17 to enter a radial slot 11.

The reciprocal action of the plunger 15 results in an easy withdrawal of the pin 17 from any of the recesses 11 and effects an accurate positioning of the wheel 10 beyond the accuracy which can be obtained by locking devices which operate in the plane of the wheel. Such devices for accuracy require peripheral teeth with non-radial sides. This results in a hooking action on the part of the coacting detent, introducing excessive wear and requiring considerable force for its withdrawal.

What is claimed is:

1. In combination, a member having formed thereon a detent, an element formed with a detent receiving aperture, said element being subject to movement carrying said aperture past said detent, means mounting said member for reciprocal movement in a direction normal to the direction of movement of said aperture whereby said detent is inserted into said aperture and withdrawn therefrom, said mounting means comprising an arm supporting a portion of said member remote from said detent, said arm extending in a direction substantially normal to the direction of movement of said member, one end of said arm pivotally engaging said member and the other end being secured for pivotal movement about an axis lying in a plane parallel with the direction of movement of said aperture, means reciprocably driving said member and a resilient supporting means for the end of said member adjacent said detent, said resilient supporting means consisting entirely of a leaf spring extending in parallelism with the direction of movement of said aperture, with its major surfaces lying in planes normal to the direction of movement of said member, the end of said leaf spring extending opposite to the direction of movement of said aperture being fixedly supported, the remaining end of said spring being secured to the end of said member adjacent said detent.

2. In combination, a member having formed thereon a pin, an element formed with a pin receiving aperture, said element being subject to movement carrying said aperture past said pin, means mounting said member for reciprocal movement in a direction normal to the direction of movement of said aperture whereby said pin is inserted into said aperture and withdrawn therefrom, said mounting means comprising an arm supporting a portion of said member remote from said detent, said arm extending in a direction substantially normal to the direction of movement of said member, one end of said arm pivotally engaging said member and the other end being secured for pivotal movement about an axis lying in a plane parallel with the direction of movement of said aperture, means reciprocably driving said member and a resilient supporting means for the end of said member adjacent said pin, said resilient supporting means consisting entirely of a leaf spring extending in parallelism with the direction of movement of said aperture, with its major surfaces lying in planes normal to the direction of movement of said member, the end of said leaf spring extending opposite to the direction of movement of said aperture being fixedly supported, the remaining end of said spring being secured to the end of said member adjacent said pin.

3. In combination, a member having formed thereon a pin, an element formed with a pin receiving aperture, said element being subject to movement carrying said aperture past said pin, means mounting said member for reciprocal movement in a direction normal to the direction of movement of said aperture whereby said pin is inserted into said aperture and withdrawn therefrom, said mounting means comprising an arm supporting a portion of said member remote from said detent, said arm extending in a direction substantially normal to the direction of movement of said member, one end of said arm pivotally engaging said member and the other end being secured for pivotal movement about an axis lying in a plane parallel with the direction of movement of said aperture, means reciprocably driving said member and a resilient supporting means for the end of said member adjacent said pin, said resilient supporting means consisting entirely of a leaf spring extending in parallelism with the direction of movement of said aperture, with its major surfaces lying in planes normal to the direction of movement of said member, the end of said leaf spring extending opposite to the direction of movement of said aperture being fixedly supported, the remaining end of said spring having formed therein a hole through which said pin extends and being bent back and received in a groove formed in said member.

4. In combination, a member having formed thereon a detent, an element formed with a detent receiving aperture, said element being subject to movement carrying said aperture past said detent, means mounting said member for reciprocal movement in a direction normal to the direction of movement of said aperture whereby said detent is inserted into said aperture and withdrawn therefrom, said mounting means comprising an arm supporting a portion of said member remote from said detent, said arm extending in a direction substantially normal to the direction of movement of said member, one end of said arm pivotally engaging said member and the other end being secured for pivotal movement about an axis lying in a plane parallel with the direction of movement of said aperture, a fixed support, means reciprocably driving said member and a resilient connecting means between the end of said member adjacent said detent and said support, said connecting means being fixed to said support at a point remote from said member, said point and said detent lying on a line which extends parallel to the direction of movement of said aperture past said detent, said connecting means being resiliently deformable in the directions in which said detent is reciprocated but non-deformable in the direction of movement of said aperture.

5. In combination, a rotatable disk having apertures extending laterally therethrough at equal distances from its center, and means for accurately stopping the rotation of said disk, said means comprising an element having formed thereon a detent receivable into said apertures, means mounting said member for reciprocal movement in a direction normal to the surface of said disk whereby said detent is inserted into said apertures and withdrawn therefrom, said mounting means comprising an arm supporting a portion of said member remote from said detent, said arm extending in a direction substantially normal to the direction of movement of said member, one end of said arm pivotally engaging said member and the other end being secured for pivotal movement about an axis lying in a plane parallel with the direction of movement of said aperture, a fixed support and a resilient connecting means between the end of said member adjacent said detent and said support, means reciprocably driving said member, said connecting means being fixed to said support at a point remote from said member, said point and said detent lying on a line tangential to the movement of said apertures, said connecting means being resiliently deformable in the directions in which said detent is reciprocated but non-deformable along the line between its points of connection to said support and said member.

6. In combination, a rotatable disk having apertures extending laterally therethrough at equal distances from its center, and means for accurately stopping the rotation of said disk, said means comprising an element having formed thereon a detent receivable into said apertures, means mounting said member for reciprocal movement in a direction normal to the surface of said disk, whereby said detent is inserted into said apertures and withdrawn therefrom, said mounting means comprising an arm supporting a portion of said member remote from said detent, said arm extending in a direction substantially normal to the direction of movement of said member, one end of said arm pivotally engaging said member and the other end being secured for pivotal movement about an axis lying in a plane parallel with the direction of movement of said aperture, a fixed support, means reciprocably driving said member, and a leaf spring connected between the end of said member adjacent said detent and said support, said leaf spring being fixed to said support with its major surfaces lying substantially parallel to the major surfaces of said disk and the line between the points of connection of said leaf spring to said member and said support extending tangentially to the movement of said apertures.

References Cited in the file of this patent

UNITED STATES PATENTS

| Number | Name | Date |
|---|---|---|
| 1,455,460 | Turnbull | May 15, 1923 |
| 1,861,937 | Philips | June 7, 1932 |
| 2,085,442 | Newell | June 29, 1937 |
| 2,115,245 | Allison | Apr. 26, 1938 |
| 2,249,753 | Elliott | July 22, 1941 |
| 2,275,892 | Engel | Mar. 10, 1942 |
| 2,514,598 | Douglas | July 11, 1950 |
| 2,515,944 | Bennett | July 18, 1950 |
| 2,516,642 | Murphy | July 25, 1950 |